United States Patent [19]
Miles

[11] Patent Number: 5,228,232
[45] Date of Patent: Jul. 20, 1993

[54] SPORT FISHING TACKLE BOX

[76] Inventor: Rodney Miles, P.O. Box 38-3462, Waikoloa, Hi. 96738-3462

[21] Appl. No.: 851,312

[22] Filed: Mar. 16, 1992

[51] Int. Cl.⁵ .......................................... A01K 97/06
[52] U.S. Cl. .................................... 43/57.1; 43/54.1
[58] Field of Search .......................... 43/54.1, 57.1; 206/315.11

[56] References Cited

U.S. PATENT DOCUMENTS

| | | | |
|---|---|---|---|
| 952,314 | 3/1910 | Ellsworth | 43/57.1 |
| 2,558,124 | 6/1951 | Burden | 43/57.1 |
| 2,948,080 | 8/1960 | Hawley | 43/57.1 |
| 3,148,811 | 9/1964 | Foltz | 43/54.1 |
| 3,182,872 | 5/1965 | Brosseau | 43/57.1 |
| 4,176,491 | 12/1979 | Herring | 43/57.1 |
| 4,729,474 | 3/1988 | Lanius | 43/54.1 |
| 5,042,193 | 8/1991 | Steiner | 43/54.1 |
| 5,054,669 | 10/1991 | Zumbardi | 43/57.1 |

Primary Examiner—Kurt C. Rowan
Attorney, Agent, or Firm—Michael I. Kroll

[57] ABSTRACT

A sport fishing tackle box is provided which consists of a generally rectangular base, a generally rectangular raised lid hinged to the generally rectangular base and a structure for retaining a plurality of different sized salt water lures and leaders therein, so that the lures are separated from each other with the leaders positioned above their respective lures.

6 Claims, 2 Drawing Sheets

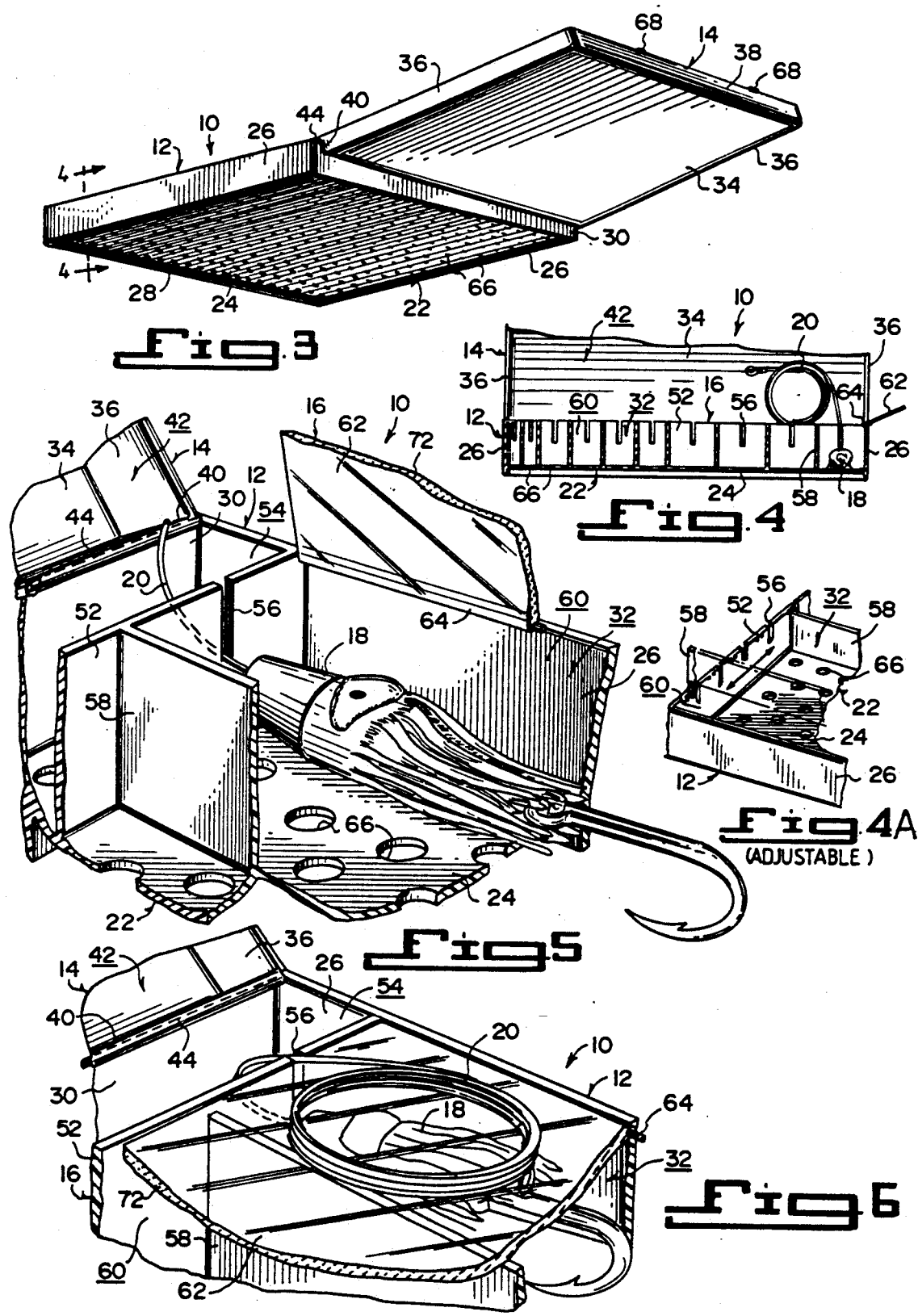

SPORT FISHING TACKLE BOX

BACKGROUND OF THE INVENTION

1. Field of the Invention

The instant invention relates generally to fishing equipment and more specifically it relates to a sport fishing tackle box.

2. Description of the Prior Art

Numerous fishing equipment have been provided in prior art that are adapted to assist fishermen and anglers in using a variety of tackle to catch fish. While these units may be suitable for the particular purpose to which they address, they would not be as suitable for the purposes of the present invention as heretofore described.

SUMMARY OF THE INVENTION

A primary object of the present invention is to provide a sport fishing tackle box that will overcome the shortcomings of the prior art devices.

Another object is to provide a sport fishing tackle box having a variety of different sized compartments for retaining a plurality of different sized salt water lures therein with a protective chamber therein for the leaders.

An additional object is to provide a sport fishing tackle box having a raised perforated bottom panel to allow the salt water lures to drain and dry out while in storage.

A further object is to provide a sport fishing tackle box that is simple and easy to use.

A still further object is to provide a sport fishing tackle box that is economical in cost to manufacture.

Further objects of the invention will appear as the description proceeds.

To the accomplishment of the above and related objects this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 3 is a rear perspective view with just the raised lid opened.

FIG. 4 is a cross sectional view taken along line 4—4 in FIG. 3.

FIG. 4A is a perspective view of a portion of the base showing an adjustable partition therein.

FIG. 5 is an enlarged perspective view of a portion of the instant invention in an opened position with a salt water lure and its leader therein.

FIG. 6 is an enlarged perspective view similar to FIG. 5 with the leader plate closed showing the leader coiled and placed on the leader plate.

DETAILED DESCRIPTION OF THE PREFERRED EMBODIMENTS

Figure 1:
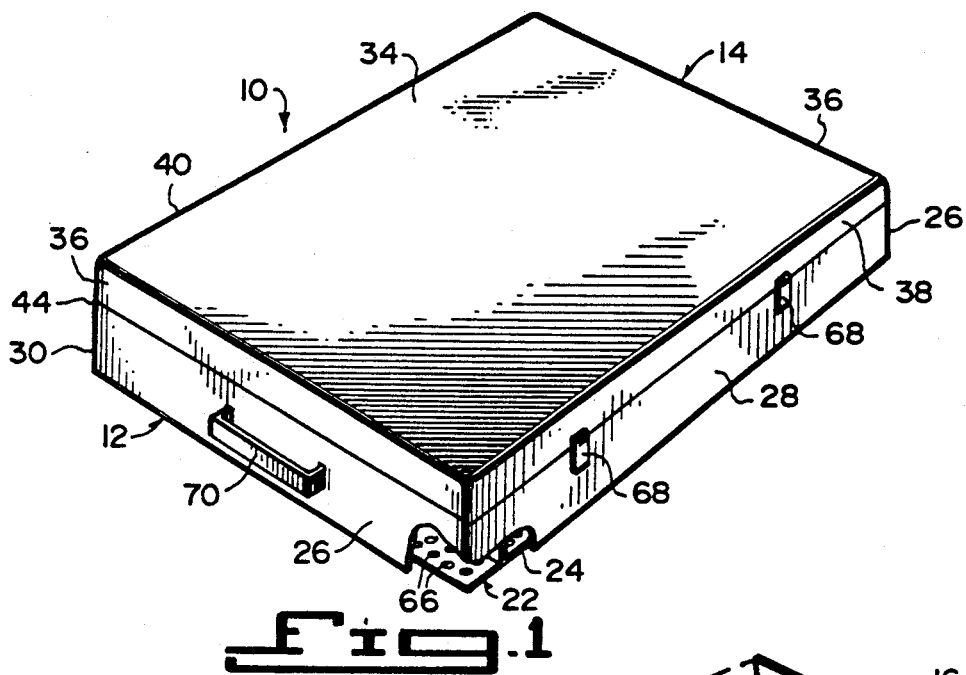
FIG. 1 is a front perspective view of the instant invention in a closed position with parts broken away.
Figure 2:
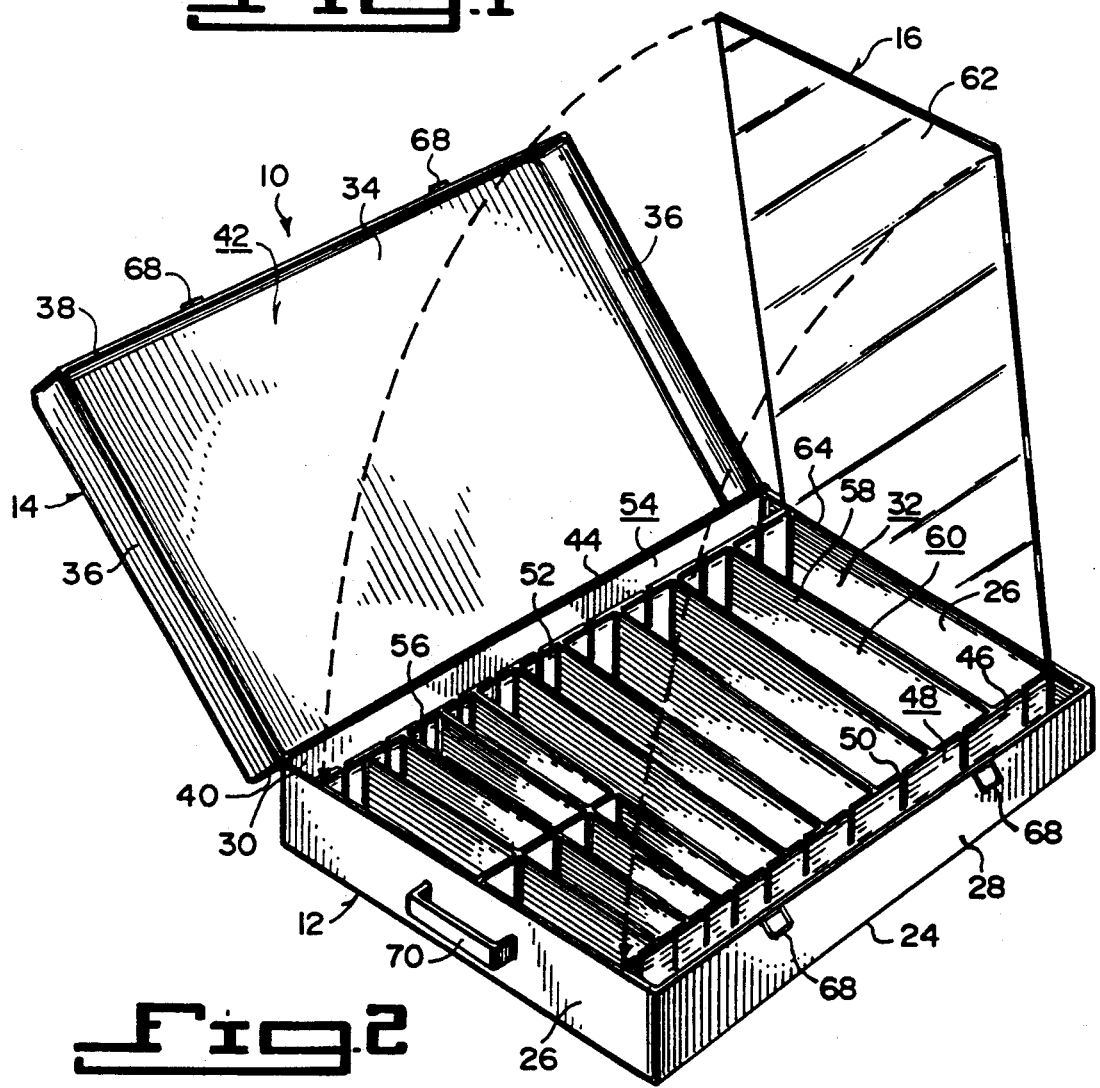
FIG. 2 is a front perspective view in an opened position.

Turning now descriptively to the drawings, in which similar reference characters denote similar elements throughout the several views, the Figures illustrate a sport fishing tackle box 10 which consists of a generally rectangular base 12, a generally rectangular raised lid 14 hinged to the generally rectangular base 12 and a structure 16 for retaining a plurality of different sized salt water lures 18 and leaders 20 therein, so that the lures 18 are separated from each other with the leaders 20 positioned above their respective lures 18. The sport fishing tackle box 10 further includes a structure 22 for draining and drying out the lures 18, while being retained.

The generally rectangular base 12 includes a bottom wall 24, a pair of side wall 26, each extending upwardly from the bottom wall 24, a front wall 28 extending upwardly from the bottom wall 24 and a rear wall 30 extending upwardly from the bottom wall 24 to form a first storage area 32 therein.

The generally rectangular raised lid 14 includes a top wall 34, a pair of side walls 36, each extending downwardly from the top wall 34, a front wall 38 extending downwardly from the top wall and a rear wall 40 extending downwardly from the top wall 34 to form a second storage area 42 therein. A first hinge member 44 is between the rear wall 30 of the generally rectangular base 12 and the rear wall 40 of the generally rectangular raised lid 14, so that the lid 14 can be opened and closed.

The retaining structure 16 includes a first partition wall 46 spaced away and extending parallel with the front wall 28 in the base 12 to form a first chamber 48 therein, the first partition wall 46 has a plurality of spaced apart slots 50 extending downwardly from a top edge. A second partition wall 52 is spaced away and extends parallel with the rear wall 30 in the base 12 to form a second chamber 54 therein. The second partition wall 52 has a plurality of spaced apart slots 56 extending downwardly from a top edge. A plurality of transverse partition walls 58 extend parallel between the slots 50 in the first partition wall 46 and the slots 56 in the second partition wall 52, to form a plurality of compartments 60 therein. A plate 62 is sized to fit over the compartments 60. A second hinge member 64 is between one side wall 26 of the generally rectangular base 12 and one side edge of the plate 62. The plate 62 can be opened to allow each different sized salt water lure 18 to be inserted within one of the compartments 60 with its respective leader 20 extending through the respective slots 50, 56 and bent within one of the chambers 48, 54 and placed in a coiled position onto the plate 62, when the plate 62 is closed.

The draining and drying out structure 22 includes the bottom wall 24, of the generally rectangular base 12 having a plurality of small apertures 66 therethrough and is inset to allow for washing off the salt water lures 18 and then drying out while being retained therein.

Two latch mechanisms 68 are provided with each extending between the front wall 28 of the base 12 and the front wall 38 of the raised lid 14, so as to lock the raised lid 14 to the base 12 when in the closed position. A handle 70 is affixed to one side wall 26 of the base 12, so that it can be carried therefrom.

The plate 62 is fabricated out of a transparent durable material 72, so that when the plate 62 is closed the different sized salt water lures 18 can be see therethrough and identified for use. As shown in FIG. 4A, each transverse partition wall 58 can be adjustable with respect to each other, so as to change the sizes of the compartments 60 therein for the different sized salt water lures 18.

LIST OF REFERENCE NUMBERS 10 sport fishing tackle box
12 generally rectangular base
14 generally rectangular raised lid
16 retaining structure
18 salt water lure
20 leader
22 draining and drying out structure
24 bottom wall of 12
26 side wall of 12
28 front wall of 12
30 rear wall of 12
32 first storage area in 12
34 top wall of 14
36 side wall of 14
38 front wall of 14
40 rear wall of 14
42 second storage area in 14
44 first hinge member
46 first partition wall
48 first chamber
50 slot in 46
52 second partition wall
54 second chamber
56 slot in 52
58 transverse partition wall
60 compartment
62 plate
64 second hinge member
66 small aperture in 24
68 latch mechanism
70 handle
72 transparent durable material for 62

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and change in the forms and details of the device illustrated and in its operation ca be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A sport-fishing tackle box which comprises:
   a) a generally rectangular base, said generally rectangular base includes a bottom wall, a pair of side walls, each extending upwardly from said bottom wall, a front wall extending upwardly from said bottom wall, and a rear wall extending upwardly from said bottom wall to form a first storage area therein;
   b) a generally rectangular raised lid hinged to said generally rectangular base by a first hinge member;
   c) means for retaining a plurality of different sized salt water lures and leaders therein, so that the lures are separated from each other with the leaders positioned above their respective lures, said retaining means includes a first partition wall spaced away and extending parallel with said front wall in said base to form a first chamber therein, said first partition wall having a plurality of spaced apart rectangular shaped slots extending downwardly from a top edge, a second partition wall spaced away and extending parallel with said rear wall in said base to form a second chamber therein, said second partition wall having a plurality of spaced apart rectangular slots extending downwardly from a top edge, a plurality of transverse partition walls extending parallel between said rectangular shaped slots in said first partition wall and said rectangular shaped slots in said second partition wall to form a plurality of compartments therein, a plate sized to fit over said compartments extending from said first partition wall to said second partition wall leaving said first and second chambers uncovered when closed, and a second hinge member attached to one of said side walls, so that said plate can be opened to allow each different sized salt water lure to be inserted within one of the compartments with its respective leader extending through said respective slot and placed in a coiled position onto said plate when said plate is closed, each said transverse partition wall is adjustable with respect to each other, so as to change the sizes of said compartments therein for the different sized salt water lures; and,
   d) means for draining and drying out the lures while being retained, said draining and drying out means includes said bottom wall of said generally rectangular base being completely covered with a plurality of small apertures therethrough and is inset to allow for washing off the salt water lures and then drying out while being retained therein.

2. A sport fishing tackle box as recited in claim 1, wherein said generally rectangular raised lid includes:
   a) a top wall;
   b) a pair of side walls, each extending downwardly from said top wall;
   c) a front wall extending downwardly from said top wall; and
   d) a rear wall extending downwardly from said top wall to form a second storage area therein.

3. A sport fishing tackle box as recited in claim 2, further including a first hinge member between said rear wall of said generally rectangular base and said rear wall of said generally rectangular raised lid, so that said lid can be opened and closed.

4. A sport fishing tackle box as recited in claim 3, further including two latch mechanisms, each extending between said front wall of said base and said front wall of said raised lid, so as to lock said raised lid to said base when in the closed position.

5. A sport fishing tackle box as recited in claim 4, further including a handle affixed to one said side wall of said base, so that it can be carried therefrom.

6. A sport fishing tackle box as recited in claim 5, wherein said plate is fabricated out of a transparent durable material, so that when said plate is closed the different sized salt water lures can be seen therethrough and identified for use.

* * * * *